(12) United States Patent
Cummings

(10) Patent No.: US 7,831,386 B2
(45) Date of Patent: Nov. 9, 2010

(54) LOOP-BASED ROUTE FINDING AND NAVIGATION

(76) Inventor: Ian Cummings, 2645 Northlawn Ave., Ypsilanti, MI (US) 48197

( * ) Notice: Subject to any disclaimer, the term of this patent is extended or adjusted under 35 U.S.C. 154(b) by 948 days.

(21) Appl. No.: 11/620,330

(22) Filed: Jan. 5, 2007

(65) Prior Publication Data
US 2008/0120027 A1  May 22, 2008

Related U.S. Application Data

(63) Continuation-in-part of application No. 11/561,050, filed on Nov. 17, 2006.

(51) Int. Cl.
*G01C 21/30* (2006.01)
(52) U.S. Cl. ................. 701/209; 701/200; 701/201; 701/208; 701/300; 340/995.13; 340/995.14; 340/995.19; 700/245; 700/253; 706/19; 706/62; 706/934
(58) Field of Classification Search .................. None
See application file for complete search history.

(56) References Cited

U.S. PATENT DOCUMENTS

| | | | | |
|---|---|---|---|---|
| 4,937,753 | A * | 6/1990 | Yamada | 701/209 |
| 4,984,168 | A * | 1/1991 | Neukrichner et al. | 701/210 |
| 5,168,452 | A * | 12/1992 | Yamada et al. | 701/202 |
| 5,204,817 | A * | 4/1993 | Yoshida | 701/209 |
| 5,285,391 | A * | 2/1994 | Smith et al. | 701/200 |
| 5,684,704 | A * | 11/1997 | Okazaki | 701/208 |
| 6,362,751 | B1 * | 3/2002 | Upparapalli | 340/995.19 |
| 2004/0073702 | A1 * | 4/2004 | Rong | 709/241 |
| 2004/0158366 | A1 * | 8/2004 | Dieterle | 701/23 |
| 2005/0187711 | A1 * | 8/2005 | Agrawala et al. | 701/211 |
| 2005/0216142 | A1 * | 9/2005 | Herzog et al. | 701/19 |
| 2006/0241854 | A1 * | 10/2006 | Tu et al. | 701/202 |
| 2007/0073897 | A1 * | 3/2007 | Sharifzadeh et al. | 709/238 |
| 2008/0004794 | A1 * | 1/2008 | Horvitz | 701/200 |
| 2008/0004802 | A1 * | 1/2008 | Horvitz | 701/209 |
| 2008/0027636 | A1 * | 1/2008 | Tengler et al. | 701/209 |
| 2008/0103686 | A1 * | 5/2008 | Alberth et al. | 701/200 |

* cited by examiner

*Primary Examiner*—Khoi Tran
*Assistant Examiner*—Jonathan L Sample
(74) *Attorney, Agent, or Firm*—Gifford, Krass, Sprinkle, Anderson & Citkowski, P.C.

(57) ABSTRACT

A navigation system and method uses loops as opposed to existing search techniques to more expeditiously find routes on a map from a starting point to a destination. Roads on a map are traced to form one or more continuous loops. Information regarding the loops is stored for future reference. A starting point and at least one destination are specified, and loops that connect the loops containing the starting point and destination are determined. A route is then formulated from the starting point to the destination using road segments or intersections where the identified loops are mutually contiguous. A list is generated including the loops and the road segments associated therewith. The road segments of an initial loop are examined and, if a road segment or intersection common to a next loop is identified, the road segments of that loop are examined, and so on, until a route from the starting point to the destination is found. Alternatively the route may be formulated by searching for routes along the roads that form one or more continuous loops connecting the starting point and the destination. Various speed-up algorithms and/or heuristics may be applied to the route formulation. The method finds application is many fields of endeavor, including wireless client-server navigation; embedded/dedicated automotive navigation, and logistics control, to name a few.

23 Claims, 5 Drawing Sheets

LOOP-BASED ROUTE FINDING AND NAVIGATION

REFERENCE TO RELATED APPLICATION

This application is a continuation-in-part of U.S. patent application Ser. No. 11/561,050, filed Nov. 17, 2006, the entire content of which is incorporated herein by reference.

FIELD OF THE INVENTION

This invention relates generally to computerized navigation and, in particular, to methods that use loops to speed up the search for a route.

BACKGROUND OF THE INVENTION

The engineering and business requirements of navigation processors in wireless client-server (WCS) navigators, in which route searches are performed at a central location then transmitted to mobile units, differ somewhat from those of standard standalone navigators. One major difference is that WCS navigation processors receive very frequent route requests from many handsets whereas standard navigators typically receive one request every few hours. Thus, in order to minimize infrastructure costs, it is important to time-optimize route generation methods.

FIG. 1 is a simplified illustration of a typical routing problem. A person at point A wishes to travel to a destination at point B. The function of a route generator is to determine a series of movements that will allow the person to reach his destination. In the parlance of artificial intelligence, the map is represented as a set of nodes (intersections) and paths between them (roads). A generic search for a route can be represented by a diagram in which each choice of path is represented by a line leading to a new choice. FIG. 2 gives an example of the start of a search diagram of a route search from A to B.

As can be seen from the figures, the number of possibilities that must be considered by routing algorithm grows very quickly with the number of nodes and paths in a map. This process can be made much more efficient with the addition of heuristics (rules), such as "don't return to the node you just came from," or "follow a path roughly in the direction of the destination," or by using depth-first search or cost heuristics, all of which are well-known and described in artificial intelligence literature. Nevertheless, as the size of a map increases, the computing time, memory, and computing power required to compute a route also increase dramatically. Given the constraints of running a WCS navigation server, it is beneficial to use a method of route generation that first simplifies the map.

SUMMARY OF THE INVENTION

This invention broadly resides in a navigation system and method that uses loops as opposed to existing search methods to more expeditiously find routes on a map from a starting point to a destination. According to the method, roads on a map are traced to form one or more continuous loops. Information regarding the loops is stored for future reference. A starting point and at least one destination are specified, and a set of one or more loops that connect the loops containing the starting point and destination is determined. A route is then formulated from the starting point to the destination using road segments or intersections where the identified loops are mutually contiguous.

In one preferred embodiment, a list is generated including the loops and the road segments associated therewith. The road segments of an initial loop are examined and, if a road segment or intersection common to a next loop is identified, the road segments of that loop are examined, and so on, until a route from the starting point to the destination is found. Alternatively the route may be formulated by searching for routes along the roads that form one or more continuous loops connecting the starting point and the destination. Various speed-up algorithms and/or heuristics may be applied to the route formulation.

Route determination may proceed between the starting position and destination in either direction, and indeed, may proceed from both ends until connection is achieved. The method may further include the step of designating major and minor loops, such that if a major loop is encountered, only major loops are investigated until the major loop enclosing the destination is found. Intersections, maneuvers, roads, or loops may also be disallowed.

The method finds application is many fields of endeavor, including wireless client-server navigation; embedded/dedicated automotive navigation, and logistics control, to name a few.

DETAILED DESCRIPTION OF THE INVENTION

Figure 1:
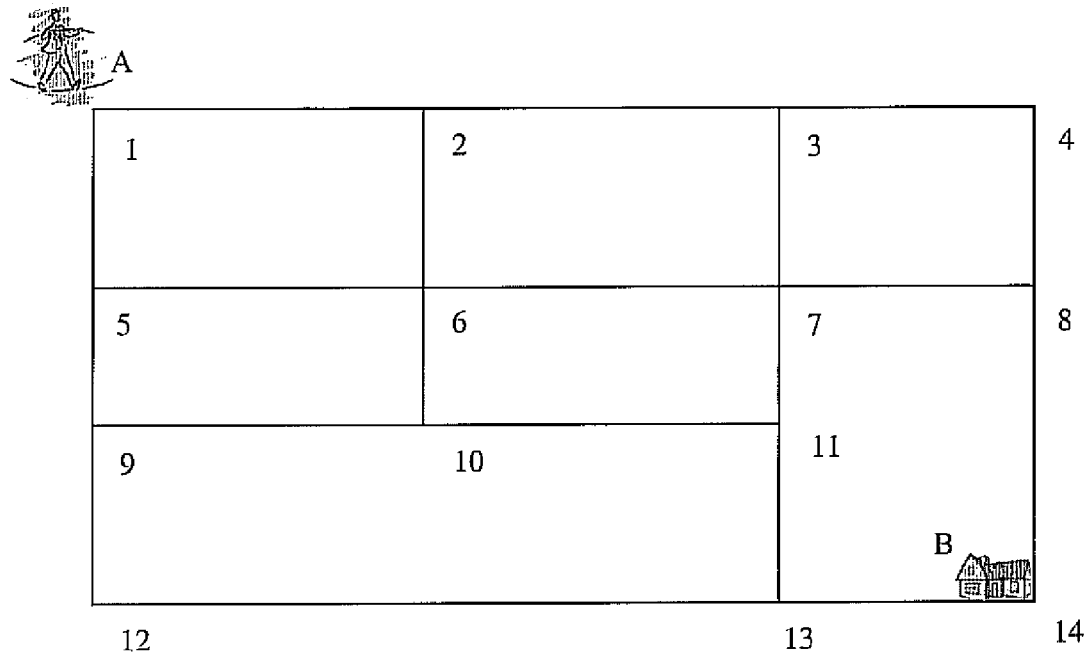
FIG. 1 is a simplified illustration of a typical routing problem.
Figure 3:
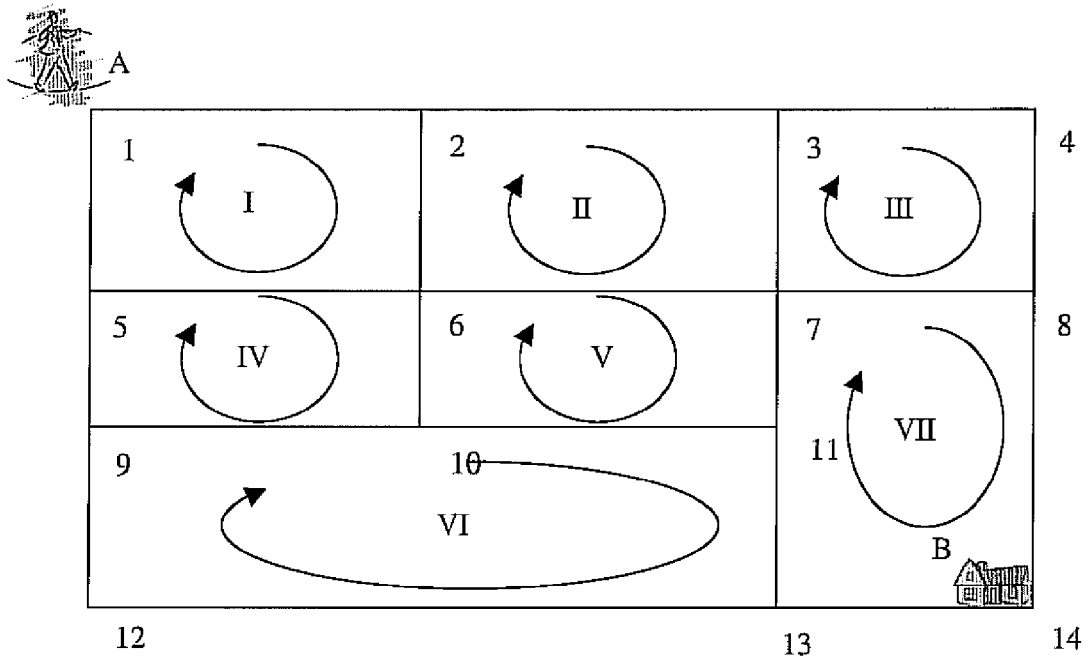
FIG. 3 shows how a map including a set of road and intersections can also be described in accordance with this invention as a set of loops of roads.
Figure 4:
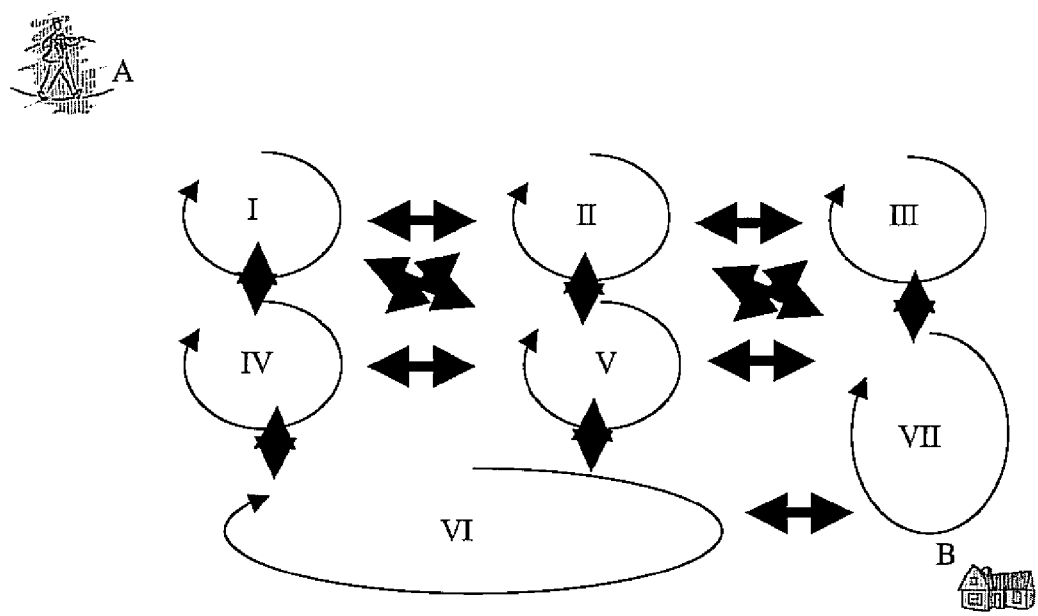
FIG. 4 depicts map nodes as loops of roads, and paths as roads or intersections at where the loops are contiguous.

The map shown in FIG. 1, described above as a set of road and intersections, can also be described as a set of loops of roads, many of which are mutually contiguous along portions of the loops. As an example, loop I, shown if FIG. 3, is composed of the road segments 1→2, 2→6, 6→5, and 5→1. It is contiguous with loop II along the road 2→6, with loop V at intersection 6, and with loop IV along the road 6→5. The map, as considered for search, can be transformed as depicted in FIG. 4. In searches of the transformed map, nodes are loops of roads, and paths are roads or intersections at which the loops are contiguous.

In the preferred embodiment of the invention loops are constructed so as to be of minimum size, meaning that no loop partially or entirely encloses another loop. Also in the preferred embodiment, all possible loops are constructed from a map and data describing the loops is stored for multiple uses by the routing algorithm. Embodiments wherein loops are constructed for each routing query or wherein loops are not of minimum size are also possible.

In comparing FIG. 1 to FIG. 4, it is immediately apparent that the described transformation reduces the number of nodes from 14 to 7, and the number of paths from 20 to 14. The transformed map can thus be searched much more quickly, increasing the efficiency of WCS navigation servers. This is a very simple example—the advantage of searching a network such as FIG. 4 over searching a network such as FIG. 1 increases very quickly with the size of the networks.

A second advantage is that the final node can be reached from the initial node in just 2 steps in FIG. 4, versus 5 steps in FIG. 1. This is due to the increased interconnectivity of FIG. 4. In FIG. 1, the node with the most connections to other nodes is intersection 6, with 4 connections. In FIG. 4, the node with the most connections is node V, with 6 connections. This is advantageous because the use of heuristics often provide greater savings in computation time in more highly-connected diagrams.

Figure 5:
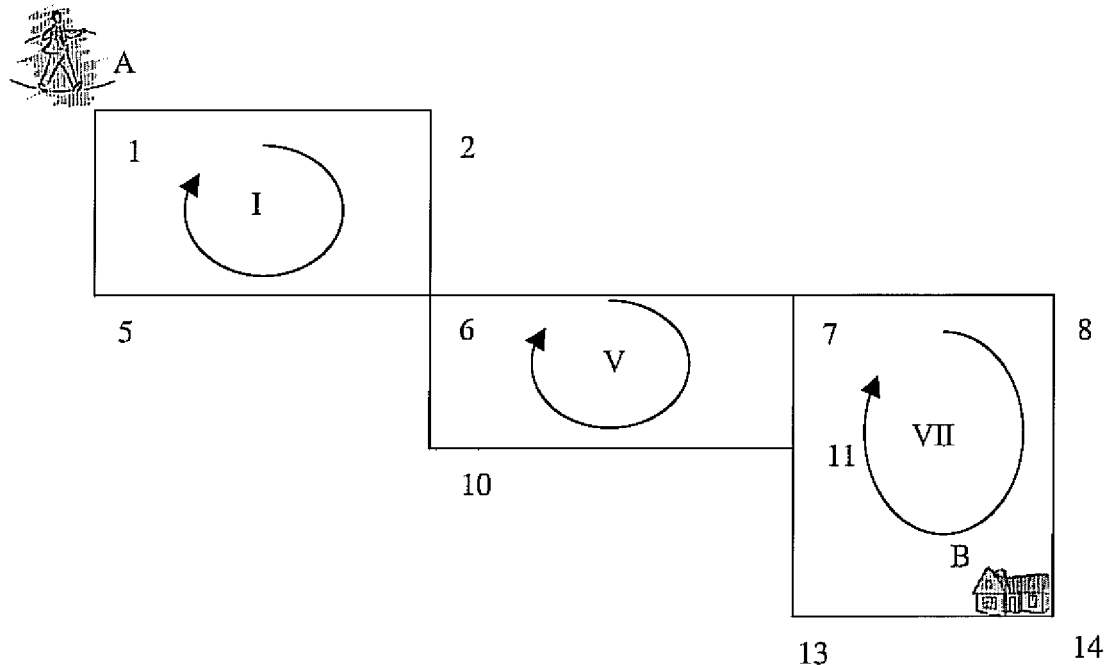
FIG. 5 illustrates a routing algorithm from a starting point to a destination.

Once a series of loops connecting the starting point to the destination (hereafter a loop-route) is found, the route must be decomposed into road segments in order to provide guidance to a user of the system. As an example, consider that the routing algorithm found the route I→V→VII from the starting point to the destination, as shown in FIG. 5.

One method of decomposing the loops into a route will be described here. Other methods of decomposition are available; this invention is not limited to route construction using only this single method of decomposition. To begin with, each loop is decomposed into its constituent road segments as shown in Table 1.

TABLE 1

| Loop | Road segments |
| --- | --- |
| I | 1→2 |
|  | 2→6 |
|  | 6→5 |
|  | 5→1 |
| V | 6→7 |
|  | 7→11 |
|  | 11→10 |
|  | 10→6 |
| VII | 7→8 |
|  | 8→14 |
|  | 14→13 |
|  | 13→11 |
|  | 11→7 |

As a first step, segments that cancel each other out, such as 7→11 and 11→7 may be removed. This first step is useful but not required by the algorithm. The route is started with the starting point in the first loop, in this case intersection 1 in loop I. The road segments are followed in their order in each loop until a node is reached that is also part of the next loop in the route, at which time nodes in that loop are followed. For the example in Table 1, route generation proceeds thus: start at loop I, intersection 1, go to intersection 2, go to intersection 6, switch to loop V, go to intersection 7, switch to loop VII, go to intersection 8, and go to intersection 14 which terminates the route generation. Alternately the loops may be followed in reverse order.

Figure 2:
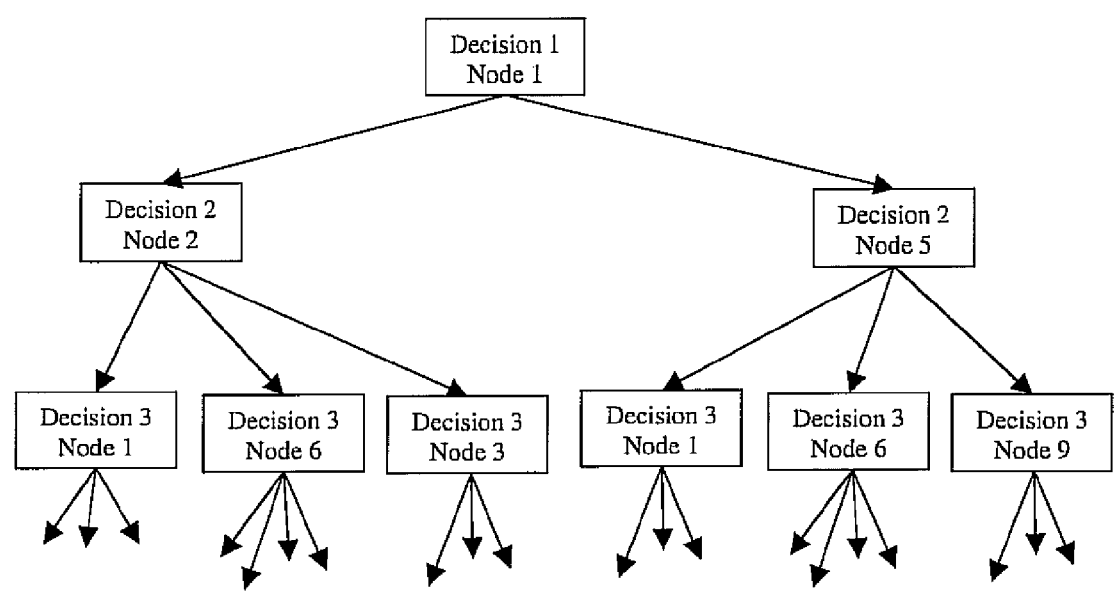
FIG. 2 is an example of the start of a search diagram of a route search from A to B.

A second method of decomposing the loops into a route is to simply treat FIG. 5 as a map and use the general search method described in FIG. 2. While this requires a second search and is more time-intensive than the method above, it also allows heuristics to be used in route generation to optimize characteristics of the route, such as minimizing the number of turns. Other possible heuristics are discussed below.

In all embodiments, the greedy, A*, SMA*, IDA*, or annealing search methods may be used to search for superior routes. Using such methods, all of which are well-known and available in artificial intelligence texts, the search may also be limited to a specified depth and/or heuristics may be used to guide the search. Possible heuristics include:

"don't include a loop already part of the route";

"depth-first search";

"determine a cost associated with added loops"—for example, by proximity to a line between the start and end point, by the size of the loops, by the heading from a point in the found route to a loop being considered for addition;

rules related to the direction from a loop on the generated route to the end point;

rules related to the proximity of considered loops to a line between the start and end point; and rules related to the proximity of a considered loop to the end point.

Intersections, maneuvers, roads, or loops may be disallowed. A disallowed loop will not be considered for addition to the generated route. If a disallowed intersection, maneuver, or road is encountered in decomposition of a loop route into a path route, the reverse path along the loop is considered. If the reverse path also contains a disallowed intersection, maneuver, or road, other methods described herein may be deployed for finding an acceptable route, starting with the current generated loop route. As examples, reasons to disallow an intersection, maneuver, or road may include "no turn" street signs or road construction.

Figure 6:
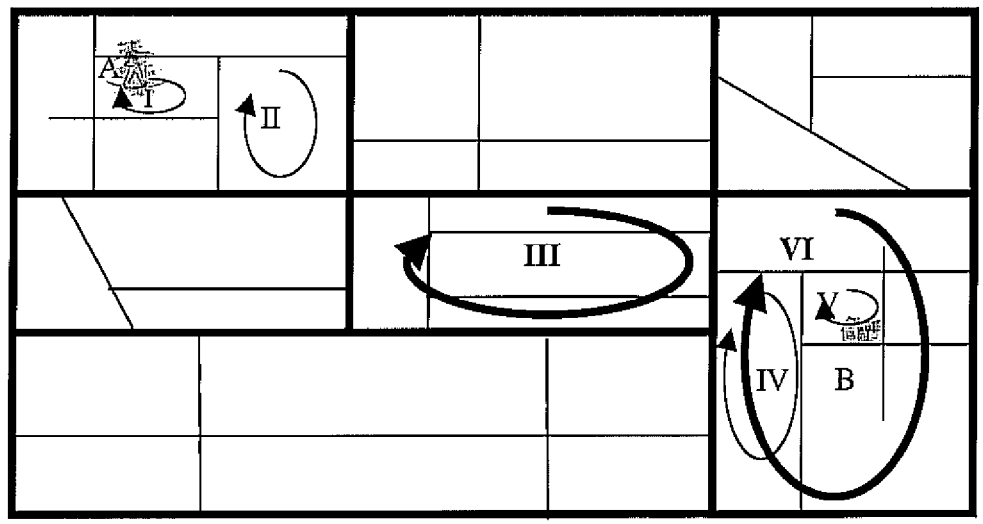
FIG. 6 shows how roads on a map can be designated as major and minor roads.

This method of search also benefits from a hierarchical approach. Roads on a map can be designated as major and minor roads. In FIG. 6 the heavy lines represent major roads, the light lines represent minor roads, and the starting and end points are not along major roads. Major loops are then constructed using only roads designated as major. For example, loops III and VI in FIG. 6 are major loops.

In hierarchically finding a route from the starting point to the destination the loop search proceeds as described above until a loop is encountered than is contiguous with a major loop. Once this occurs, only major loops are searched until the major loop enclosing the destination is found. Minor loops are then used for continuing search until the destination is found. As an example, a search of the above map might proceed thus: The search begins with loop I and proceeds to loop II. Since loop I is contiguous with a major loop now only major loops will be considered until the major loop surrounding the destination is found. The search then proceeds to loop III, then loop VI. Since loop VI encloses the destination but is not next to the destination, loop VI is not added to the route. Instead the route search proceeds with minor loops, loop IV then loop V. Composition of a route from the loop route is then performed as above.

This hierarchical approach reduces the number of nodes and paths that must be considered, thus reducing the processing power, memory, and time required to perform the search. Using a hierarchy with multiple levels is also useful.

To deal with limited-access roads, which can only be entered or exited at a limited number of points, each loop which is enclosed by a major loop consisting partially or wholly of limited access roads (hereafter a limited major loop) or is in proximity to a limited major loop is associated with one or more points at which entry and/or exit from the limited major loop is allowed (hereafter access points). When the route-generation algorithm determines that it is desirable to traverse the limited major loop, a route is generated from a loop containing the start point or other loop on the generated route to an access point on the limited major loop associated the with the starting point or another point on the generated route. When a limited major loop enclosing the end point is found, a route is generated from the access point of the limited major loop associated with a loop on which the end location lies to the end location.

Again, one or more rules may be used to determine which access points of a limited major loop are associated with a loop. For example, the rule may be associated with distance from the loop to the limited major loop, or may be related to estimated travel time from the loop to the limited major loop. Alternatively, multiple access points to the limited major loop may be associated with loops and one or more criteria may be used by the route generation algorithm to determine which access point is appropriate to the route being generated. Such criteria may include proximity to a line between the start and end point, estimated travel time, and so forth.

Figure 8:
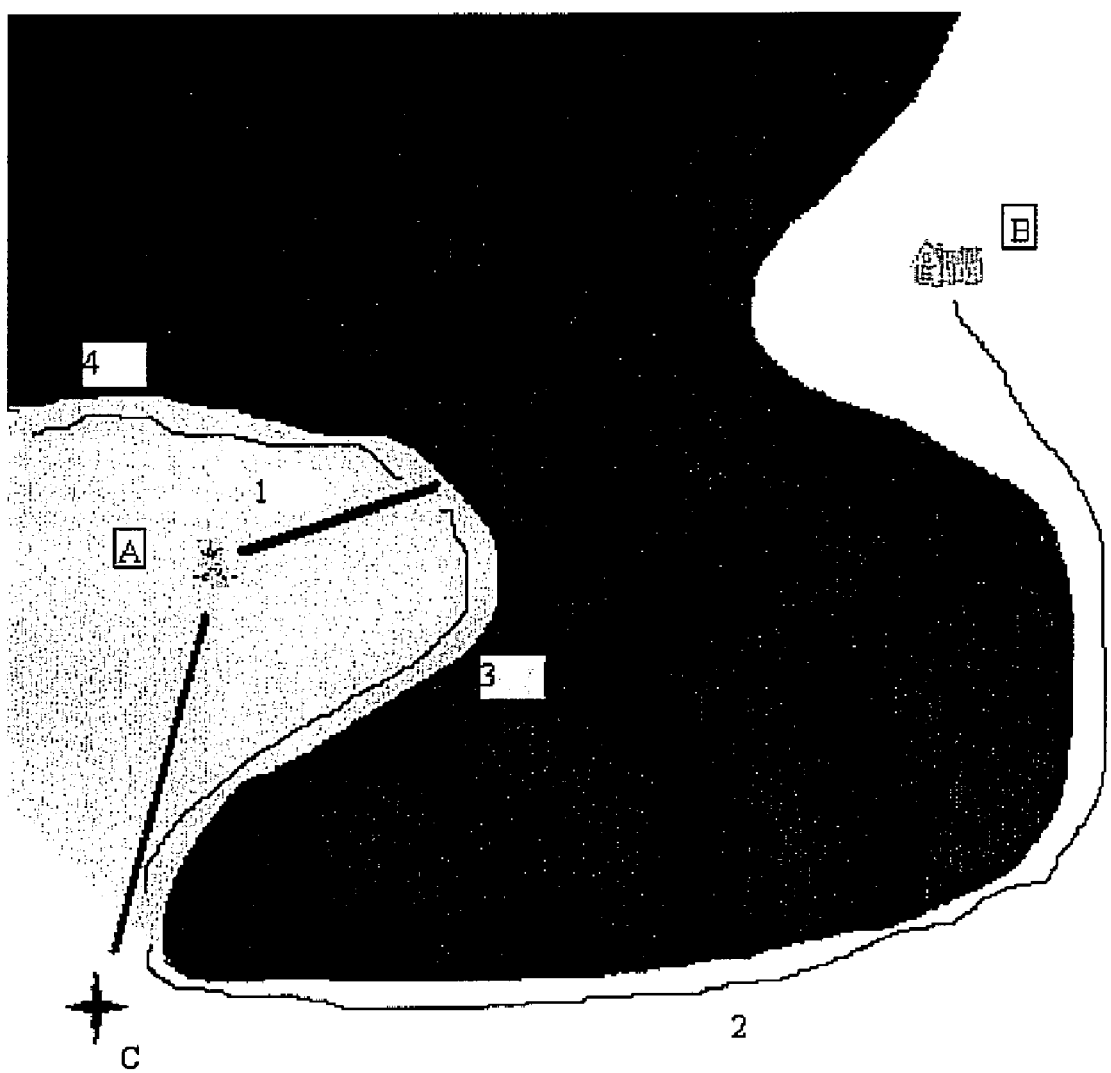
FIG. 8 shows how loops in proximity to barriers to travel may be associated with loops that facilitate circumventing the barer.

Heuristics may also be used to guide routes around barriers to travel. FIG. 8 gives an example of such a barrier. The user wishes to navigate from point A to point B, but cannot travel from A to B in a straight line due to water. One possible heuristic is to consider one or more routes that follow a barrier. In FIG. 8, a loop routing algorithm depending solely on adding loops to the route that are the closest to the destination point would first add loops along path 1, then add all loops in the region colored yellow, then add loops along the path 2. Searching the entire yellow region is suboptimal. If the search follows the barrier, the search would proceed along path 1 until it reaches the barrier, then consider loops along paths 3 and 4 until path 2 was reached, at which point normal search could resume.

As another heuristic, loops in proximity to barriers to travel are associated with loops that facilitate circumventing the barrier. For example, in FIG. 8, a loop in which point A lies could be associated with a loop in which point C lies. When the routing algorithm determines that a barrier separates the start and end point, a route is first generated from A to C, then path 2 is generated from C to B. As a further alternative, barriers may be considered to be part of a limited major loop, with other methods described herein being used to circumvent the barrier.

The loop route-generation method may be performed top-down; that is, a route is first generated in terms of major loops starting with the major loop enclosing the starting point and ending with the major loop enclosing the end point. Routes from the major loops to the start and end point are then generated.

Routes may be simultaneously generated from the start to end point and in the reverse direction. When a common loop is found between the two generated routes, initial route generation is completed.

A path may also be generated that visits all of a plurality of selected points.

Real time, historical, and/or predicted road traffic load and/or estimated travel times may be used to inform and guide the route search.

Figure 7:
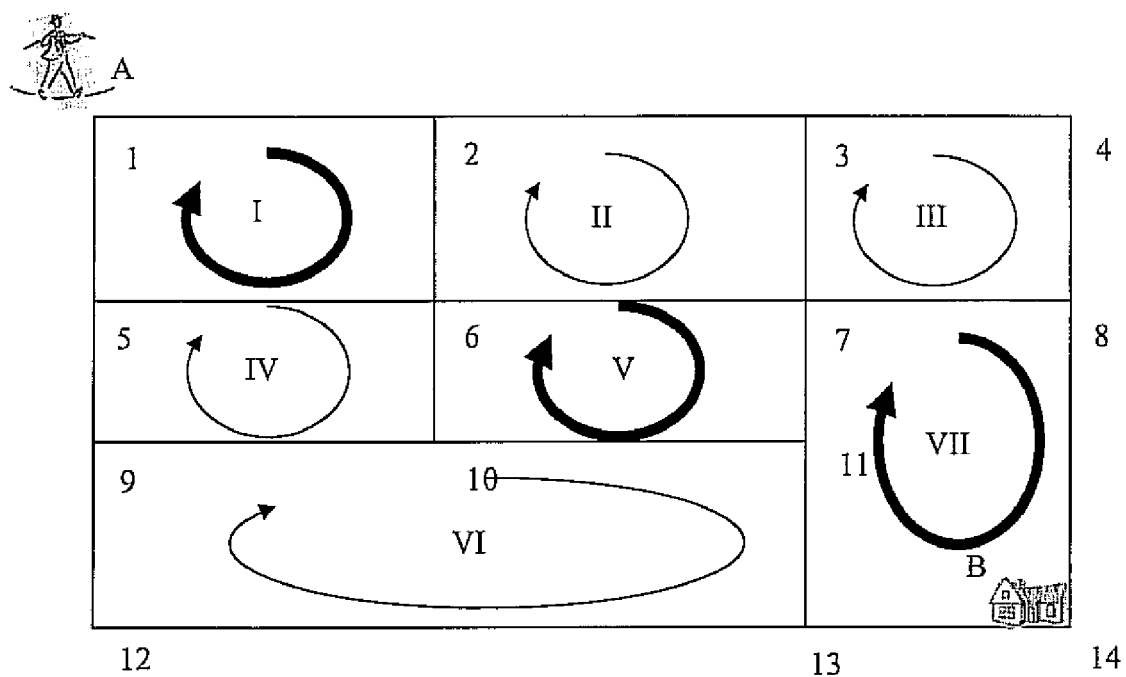
FIG. 7 illustrates an alternative embodiment of the invention, wherein cells are added to a found loop in order to search for a better loop.

FIG. 7 illustrates an extension of the loop route-generation method, in which cells are added to a found loop in order to search for a better loop. A path from A to B has been found consisting of loops I, V, VII, which can be decomposed into a route 1, 2, 6, 7, 8, 14. This improvement could consider adding loop II to the found route. A route decomposed from following the perimeter of the new loop-route would be 1, 2, 3, 7, 8, 14.

Various search methods may be used to seek for an improved loop-route from a given loop-route. These include the A*, SMA*, IDA*, greeday and annealing methods, among others, that are well-known and available in artificial intelligence texts. The search may be limited to a specified depth and/or heuristics may be used to guide the search. Possible heuristics include:

"only consider loops for addition to the loop-route that are contiguous with loops that are already part of the loop-rout"

"don't include a loop already part of the route";

"depth-first search";

"determine a cost associated with added loops"—for example, by proximity to a line between the start and end point, by the size of the loops, by the heading from a point in the found route to a loop being considered for addition;

rules related to the direction from a loop on the generated route to the end point; rules related to the proximity of considered loops to a line between the start and end point; and rules related to the proximity of a considered loop to the end point.

"purge loop routes from consideration are identical to a route already generated";

For further improvement the original found route may be compared to the new found route with a selection of one as superior. The selection may be based on various criteria, such as the number of turns in the route, the total travel distance or estimated total travel time. The method may also include the step of conducting a route search, starting with an original route, in which multiple loops contiguous with the original route or contiguous with a previously added loop are added to the original loop to attempt to find a superior route.

Multiple routes between two or more points may be considered, compared, or combined.

The loop route-generation methods disclosed herein may be used in various environments, including wireless client-server systems, standalone automotive navigators and fully automated guidance of vehicles, whether on a highway, in a warehouse, or elsewhere. Other applications include logistics control systems, where routing of goods is determined, and traffic management system, in which vehicles are guided to routes for the good of the users of a region as a whole. This may, for example, be a system that allocates drivers to a plurality of routes in order to minimize total travel time of vehicles.

I claim:

1. A navigation method, comprising the steps of:

providing a map having a network of roads and intersections;

tracing the roads to form one or more continuous loops;

specifying a starting point and a destination on the map;

graphing the map such that the loops are represented as nodes and common roads or intersections between the loops are represented as edges; and using a greedy, A*, SMA*, IDA*, or annealing search method on the graph to identify a set of one or more loops linked by mutually contiguous roads and/or intersections such that a route can be traced from the starting point to the destination along the roads and/or intersections comprising the identified loops.

2. The method claim 1, including the step of using a plurality of initial loops as the starting node of the search method.

3. The method of claim 1, including the step of searching for routes along the roads that form one or more continuous loops connecting the starting point and the destination.

4. The method claim 1, including the steps of:

designating one or more of the loops as major loops;

if a major loop is added to a candidate set of identified loops, adding only major loops to the candidate set until a major loop enclosing, including, or in proximity to the destination is found.

5. The method claim 1, including the steps of:
designating one or more of the loops as major loops;
formulating a partial route beginning with the major loop including, enclosing, or in proximity to the starting point and ending with the major loop including, enclosing, or in proximity to the end point; and
formulating a final route from the major loops to the starting point and destination.

6. The method claim 1, including the steps of:
formulating two partial routes by simultaneously generated paths from the starting point to the destination and from the destination to the starting point; and
formulating a final route by finding a common loop between the two generated routes.

7. The method claim 1, including the step of applying one or more heuristics to the route formulation.

8. The method claim 1, including the step of disallowing intersections, maneuvers, roads, or loops.

9. The method claim 8, including the step of investigating a reverse path in the event that an intersection, maneuver, road, or loop is disallowed.

10. The method claim 1, including the step of using one or more heuristics to formulate a route around a barrier.

11. The method claim 1, including the step of deleting road segments that cancel.

12. The method claim 1, including the steps of:
specifying multiple destinations; and
using the steps to visit each of the destinations in a sequence specified by a user or algorithm.

13. The method claim 1, including the step of using real time, historical, predicted road traffic load or estimated travel times to improve route formulation.

14. The method claim 1, wherein the steps are used in conjunction with a wireless client-server navigation system.

15. The method claim 1, wherein the steps are used in conjunction with an automotive navigation system.

16. The method claim 1, wherein the steps are used in conjunction with a logistics control system.

17. The method claim 1, wherein the steps are used in conjunction with a fully automated guidance system.

18. The method claim 1, wherein the steps are used in conjunction with a traffic management system.

19. The method claim 1, including the steps of:
formulating an initial route; and
improving the route by adding, deleting, and/or substituting loops.

20. The method claim 19, including the step of applying one or more heuristics to improve the route.

21. The method claim 4, in which the network contains one or more limited-access roads that can be entered or exited only at a limited number of points, and in which one or more limited major loops are designated which consist partially or entirely of limited access roads, the method further comprising the steps of:
associating each limited major loop, and any loops in proximity to and/or enclosed by it, with one or more access points at which entry and/or exit from the limited major loop is allowed;
and if it is desirable to traverse the limited major loop;
generating a route from a loop containing the start point or other loop on the generated route to an access point on the limited major loop associated the with the starting point or another point on the generated route; and if it is desirable to exit the limited major loop;
generating a route from the access point of the limited major loop associated with the loop containing the end point or another loop to which travel is desirable to the loop on which the end location lies or another loop to which travel is desirable.

22. The method of claim 21, further including the step of applying one or more rules to determine which access points of a limited major loop are associated with a loop.

23. The method of claim I, further including the steps of:
determining possible loops from the map; and
storing data describing the possible loops for future route generation.

* * * * *